United States Patent
Huisman

(10) Patent No.: US 9,808,728 B1
(45) Date of Patent: Nov. 7, 2017

(54) TOY VEHICLE HAVING LATERALLY EXPANDING WHEELS

(71) Applicant: TOMY International, Inc., Dyersville, IA (US)

(72) Inventor: Christopher Huisman, Dyersville, IA (US)

(73) Assignee: TOMY INTERNATIONAL, INC., Dyersville, IA (US)

( * ) Notice: Subject to any disclaimer, the term of this patent is extended or adjusted under 35 U.S.C. 154(b) by 0 days.

(21) Appl. No.: 15/420,413

(22) Filed: Jan. 31, 2017

(51) Int. Cl.
  *A63H 17/26* (2006.01)
  *A63H 17/05* (2006.01)
  *B62K 9/00* (2006.01)
  *B60B 35/10* (2006.01)

(52) U.S. Cl.
  CPC .......... *A63H 17/262* (2013.01); *A63H 17/05* (2013.01); *B60B 35/1009* (2013.01)

(58) Field of Classification Search
  CPC .... A63H 17/00; A63H 17/002; A63H 17/004; A63H 17/26; A63H 17/262; B62K 9/00
  USPC .......... 446/465, 469, 470, 448, 449
  See application file for complete search history.

(56) References Cited

U.S. PATENT DOCUMENTS

| | | | |
|---|---|---|---|
| 4,773,889 A | 9/1988 | Rosenwinkel et al. | |
| 5,487,692 A * | 1/1996 | Mowrer | B60B 19/04 440/92 |
| 6,752,684 B1 | 6/2004 | Lee | |
| 7,387,558 B2 | 6/2008 | Swisher et al. | |
| 7,833,081 B2 | 11/2010 | Hippely et al. | |
| 2011/0021112 A1 | 1/2011 | Suzuki | |
| 2014/0248821 A1 | 9/2014 | Hippely et al. | |

\* cited by examiner

*Primary Examiner* — Kien Nguyen
(74) *Attorney, Agent, or Firm* — Lando & Anastasi, LLP

(57) ABSTRACT

A toy vehicle includes a chassis, at least two wheels, and an actuating mechanism configured to couple the at least two wheels to the chassis and to move the at least two wheels between a retracted position and an extended position in which a width of each wheel of the at least two wheels is increased. The actuating mechanism includes a lever configured to be moved between a first position corresponding to the retracted position of the at least two wheels and a second position corresponding to the extended position of the at least two wheels. The actuating mechanism further may include an actuator configured to move the lever from the first position to the second position and from the second position to the first position.

14 Claims, 7 Drawing Sheets

TOY VEHICLE HAVING LATERALLY EXPANDING WHEELS

BACKGROUND OF THE DISCLOSURE

1. Field of Disclosure

The present disclosure relates generally to toys, and more particularly to a toy vehicle embodying a truck or passenger vehicle having laterally expanding wheels.

2. Discussion of Related Art

Toy vehicles, such as toy trucks, are oftentimes configured to transform from one embodiment into another embodiment. Toy vehicles that are capable of transforming provide entertainment to children playing with them. Examples of such toy vehicles can be found in U.S. Pat. Nos. 4,773,889, 6,752,684, 7,387,558 and 7,833,081, and in U.S. Patent Application Publication Nos. 2011/0021112 A1 and 2014/0248821 A1.

SUMMARY OF DISCLOSURE

One aspect of the present disclosure is directed to a toy vehicle comprising a chassis, at least two wheels, and an actuating mechanism configured to couple the at least two wheels to the chassis and to move the at least two wheels between a retracted position and an extended position in which a width of each wheel of the at least two wheels is increased.

Embodiments of the toy vehicle further may include the actuating mechanism having a lever configured to be moved between a first position corresponding to the retracted position of the at least two wheels and a second position corresponding to the extended position of the at least two wheels. The actuating mechanism further may include a first gear section secured to a first arm of the lever and coupled to a first hub of a first wheel of the at least two wheels, and a second gear section coupled to a second hub of a second wheel of the at least two wheels. The first gear section may be coupled to the second gear section by a gear. The actuating mechanism further may include an actuator configured to move the lever from the first position to the second position and from the second position to the first position. The actuator may include a spindle having a cam surface, a collar having an inner surface configured to engage the cam surface of the spindle, and a spring configured to bias the collar, the spindle being secured to the lever to move the lever from one of the first position to the second position and the second position to the first position when moving the collar from a raised position to a lowered position. The toy vehicle further may include packaging coupled to the collar to move the collar from the raised position to the lowered position, with the spring being configured to move the collar back to the raised position. The actuating mechanism further may include a third gear section secured to a second arm of the lever and coupled to a third hub of a third wheel of the at least two wheels, and a fourth gear section coupled to a fourth hub of a fourth wheel of the at least two wheels. Each wheel of the at least two wheels may include an outer wheel section movable with respect to its respective hub. The outer wheel section may have treads. The toy vehicle may be one of a truck and a passenger vehicle.

Another aspect of the present disclosure is directed to a toy vehicle comprising a chassis, two front wheels coupled to the chassis and two rear wheels coupled to the chassis, and an actuating mechanism configured to couple the front wheels and the rear wheels to the chassis and to move each wheel of the front wheels and the rear wheels between a retracted position and an extended position in which a width of the wheel is increased.

Embodiments of the toy vehicle further may include the actuating mechanism having a lever configured to be moved between a first position corresponding to the retracted position of each wheel of the front wheels and the rear wheels and a second position corresponding to the extended position of each wheel of the front wheels and the rear wheels. The actuating mechanism further may include a first gear section secured to a first arm of the lever and coupled to a first hub of a first wheel of the at least two wheels and a second gear section coupled to a second hub of a second wheel of the at least two wheels. The actuating mechanism further may include a third gear section secured to a second arm of the lever and coupled to a third hub of a third wheel of the at least two wheels, and a fourth gear section coupled to a fourth hub of a fourth wheel of the at least two wheels. The first gear section may be coupled to the second gear section by a first gear and the third gear section is coupled to the fourth gear section by a second gear. The actuating mechanism further may include an actuator configured to move the lever from the first position to the second position and from the second position to the first position. The actuator may include a spindle having a cam surface, a collar having an inner surface configured to engage the cam surface of the spindle, and a spring configured to bias the collar, the spindle being secured to the lever to move the lever from one of the first position to the second position and the second position to the first position when moving the collar from a raised position to a lowered position. The toy vehicle further may include packaging coupled to the collar to move the collar from the raised position to the lowered position, with the spring being configured to move the collar back to the raised position. Each wheel of the at least two wheels may include an outer wheel section movable with respect to its respective hub.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure. In the figures:

DETAILED DESCRIPTION

Figure 1A:
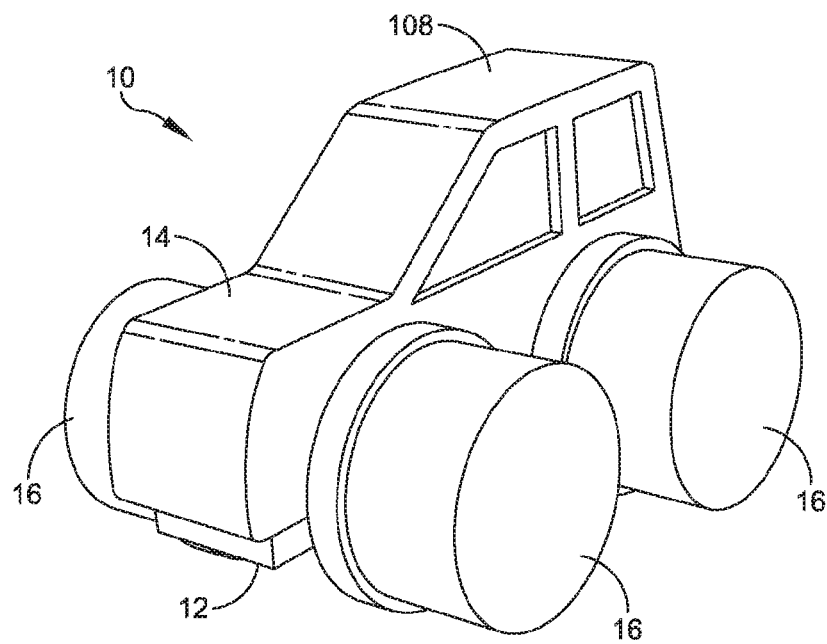
FIGS. 1A and 1B are perspective views of a toy vehicle having laterally expanding wheels in a retracted position.

The present disclosure is directed to a toy vehicle that is configured to provide entertainment to children. In one embodiment, the toy vehicle is a toy truck that has four wheels, with each wheel being capable of laterally expanding to provide a more aggressive and fun stance. Specifically, the toy vehicle includes an actuating mechanism that is configured to extend a width of all of the wheels of the toy vehicle upon actuating the actuating mechanism. In a certain embodiment, packaging of the toy vehicle, e.g., a cockpit of a passenger vehicle, can be pressed or otherwise manipulated by a person playing with the toy vehicle to extend the wheels. The person can press the packaging again to retract the wheels.

Referring now to the drawings, and more particularly to FIGS. 1A, 1B, 2A and 2B, a toy vehicle is generally indicated at 10. As shown, the toy vehicle 10 is in the form of a passenger vehicle. However, it should be understood that the toy vehicle 10 can embody many other forms as well. For example, the toy vehicle 10 can be configured to embody a tractor, a truck, a car, a race care, a tractor trailer, a bus, or any type of vehicle having two or four wheels that is particularly enticing to children.

In the shown embodiment, the toy vehicle 10 includes a chassis 12 that is configured to support the various components of the toy vehicle. For example, the chassis 12 can be fabricated from plastic, metal, or any combination of materials. The toy vehicle 10 further includes packaging 14, which can be referred to as a body of the toy vehicle. The packaging 14 may have various components of the toy vehicle 10, including but not limited to doors, a windshield, windows, a hood, a trunk, headlights, taillights, and a bumper. The packaging 14 is suitably connected to the chassis 12, and may be fabricated from any lightweight material, such as metal (e.g., aluminum), plastic, or wood. The toy vehicle 10 further includes four wheels, each indicated at 16, which are rotatably coupled to the chassis 12. As shown, each wheel 16 is configured to resemble a passenger vehicle wheel, and is configured to extend laterally in the manner described below to expand a width of the wheel.

Figure 1B:
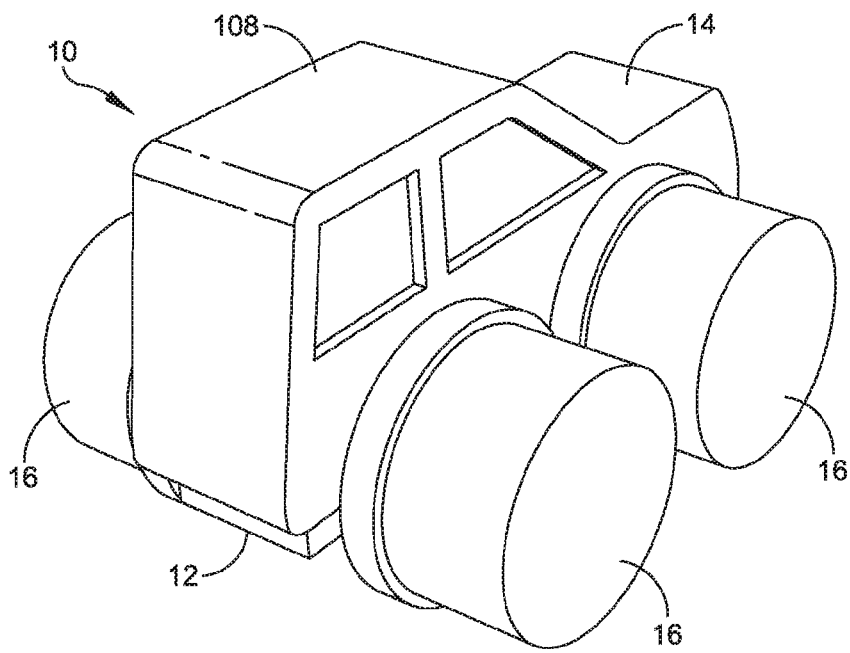
Figure 2A:
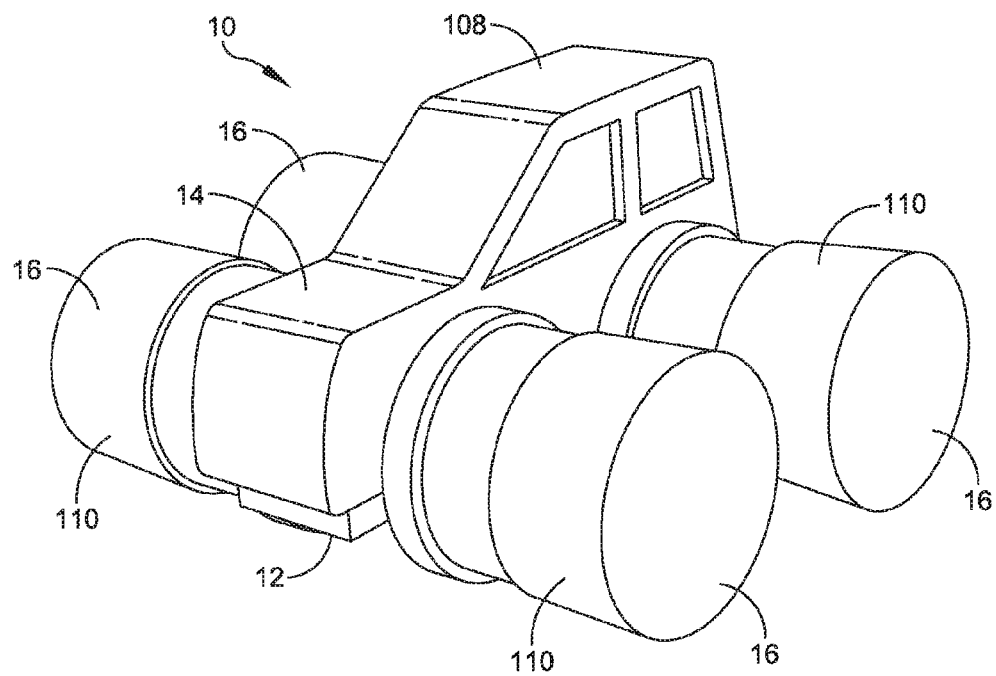
FIGS. 2A and 2B are perspective views of the toy vehicle showing the laterally expanding wheels in an extended position.
Figure 2B:
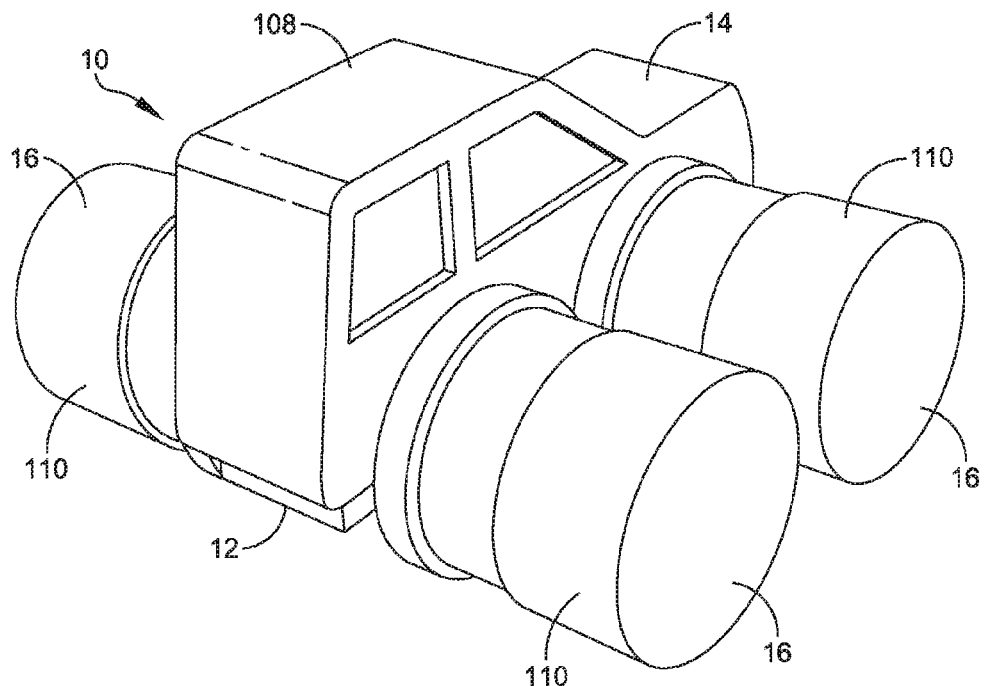

FIGS. 1A and 1B illustrate the wheels 16 in a retracted, compact configuration in which the wheels of the toy vehicle 10 have a relatively narrow width. FIGS. 2A and 2B illustrate the wheels 16 in an extended configuration in which the wheels of the toy vehicle 10 have a relatively wide width. As shown, the wheels 16, when in their extended configuration, are approximately twice as wide as when the wheels are in their retracted configuration. The manner in which the wheels 16 are moved between their respective retracted and extended configurations will be discussed in greater detail below.

Figure 3:
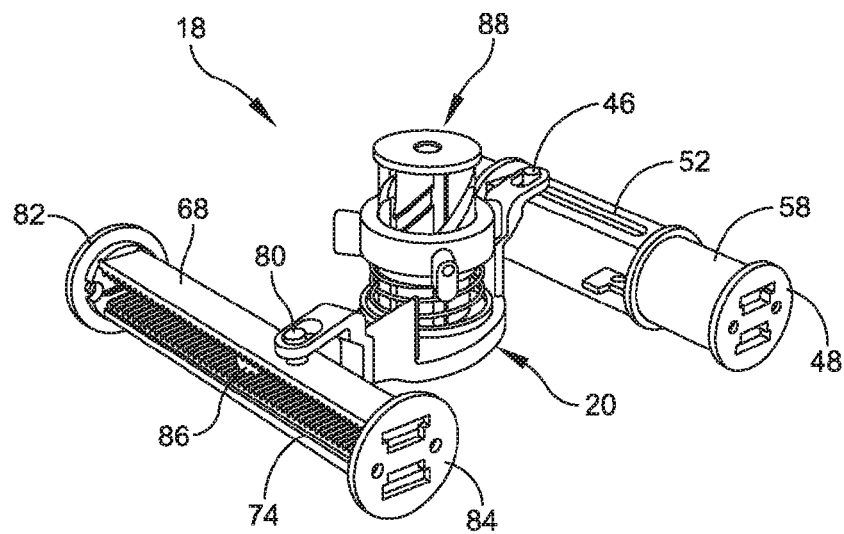
FIG. 3 is a perspective view of an actuating mechanism of the toy vehicle in a retracted configuration.
Figure 4:
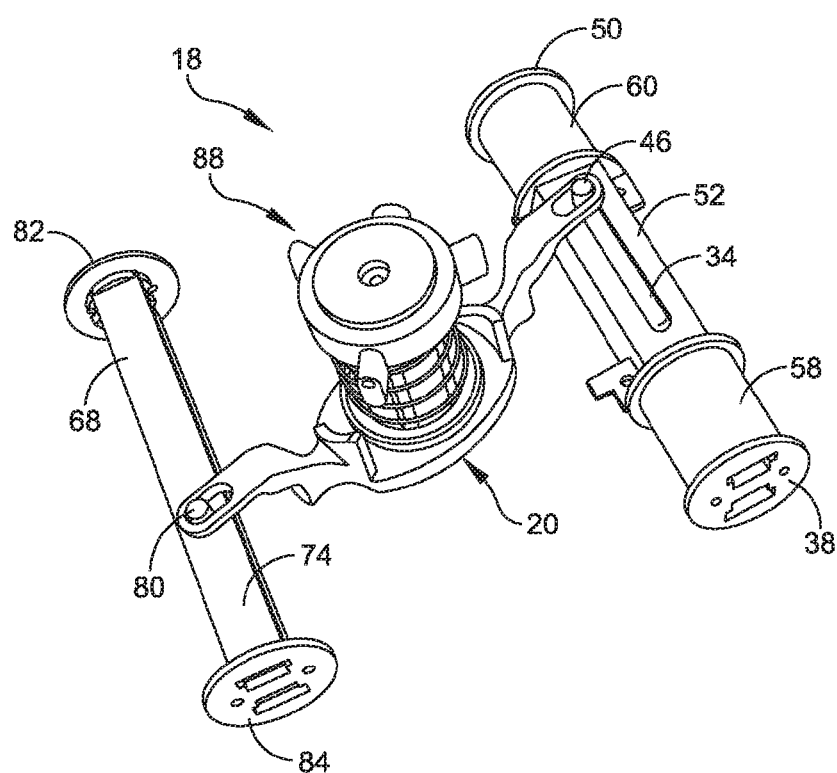
FIG. 4 is another perspective view of the actuating mechanism shown in FIG. 3.
Figure 5:
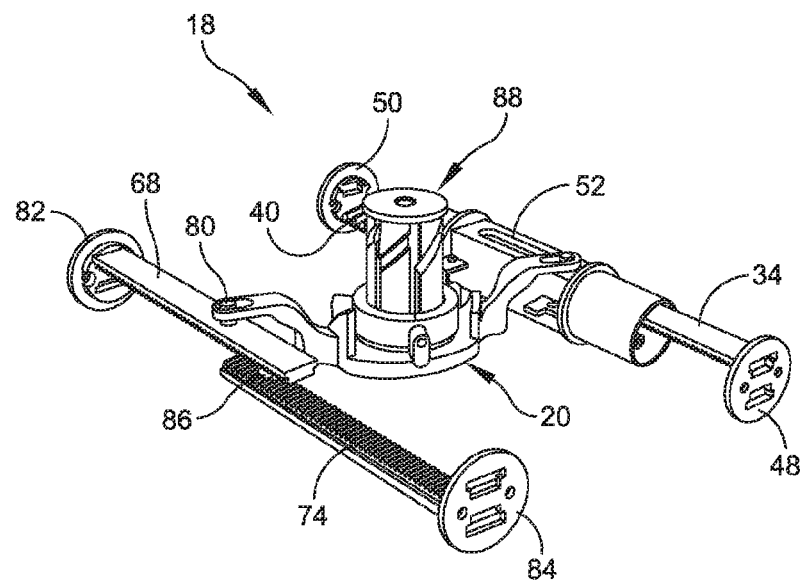
FIG. 5 is a perspective view of the actuating mechanism in an extended configuration.
Figure 6:
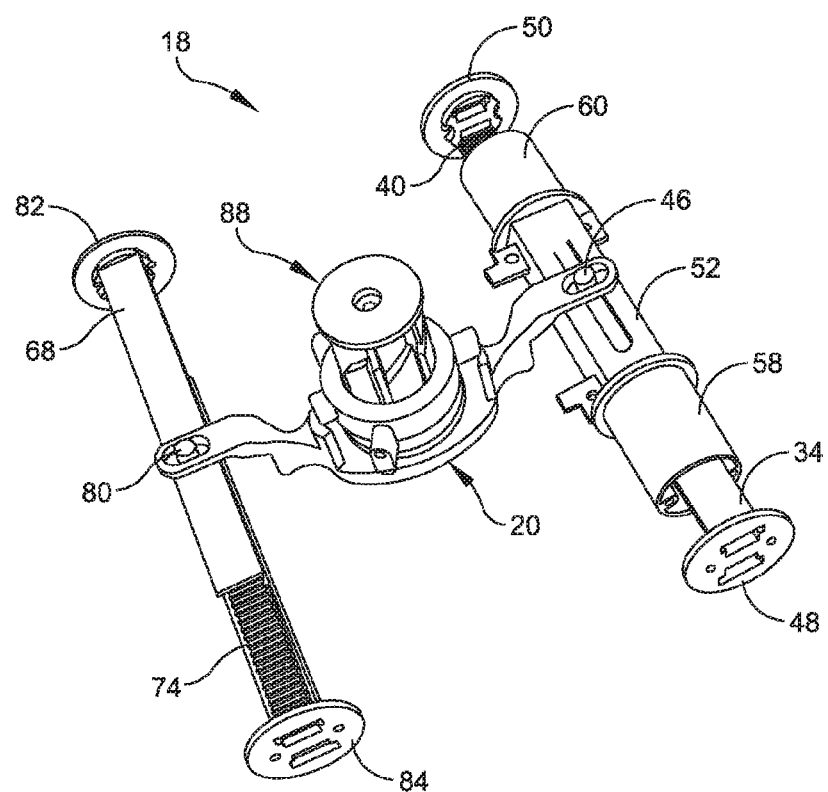
FIG. 6 is another perspective view of the actuating mechanism shown in FIG. 5.

Referring to FIGS. 3-6, the toy vehicle 10 includes an actuating mechanism, which is generally indicated at 18. The actuating mechanism 18 is supported by the chassis 12 of the toy vehicle 10, and provides the means used to move the wheels 16 between their respective retracted and extended positions. FIGS. 3 and 4 illustrate the actuating mechanism 18 in a position in which the wheels 16 are in the retracted configuration. FIGS. 5 and 6 illustrate the actuating mechanism 18 in a position in which the wheels 16 are in the extended configuration.

Figure 7A:
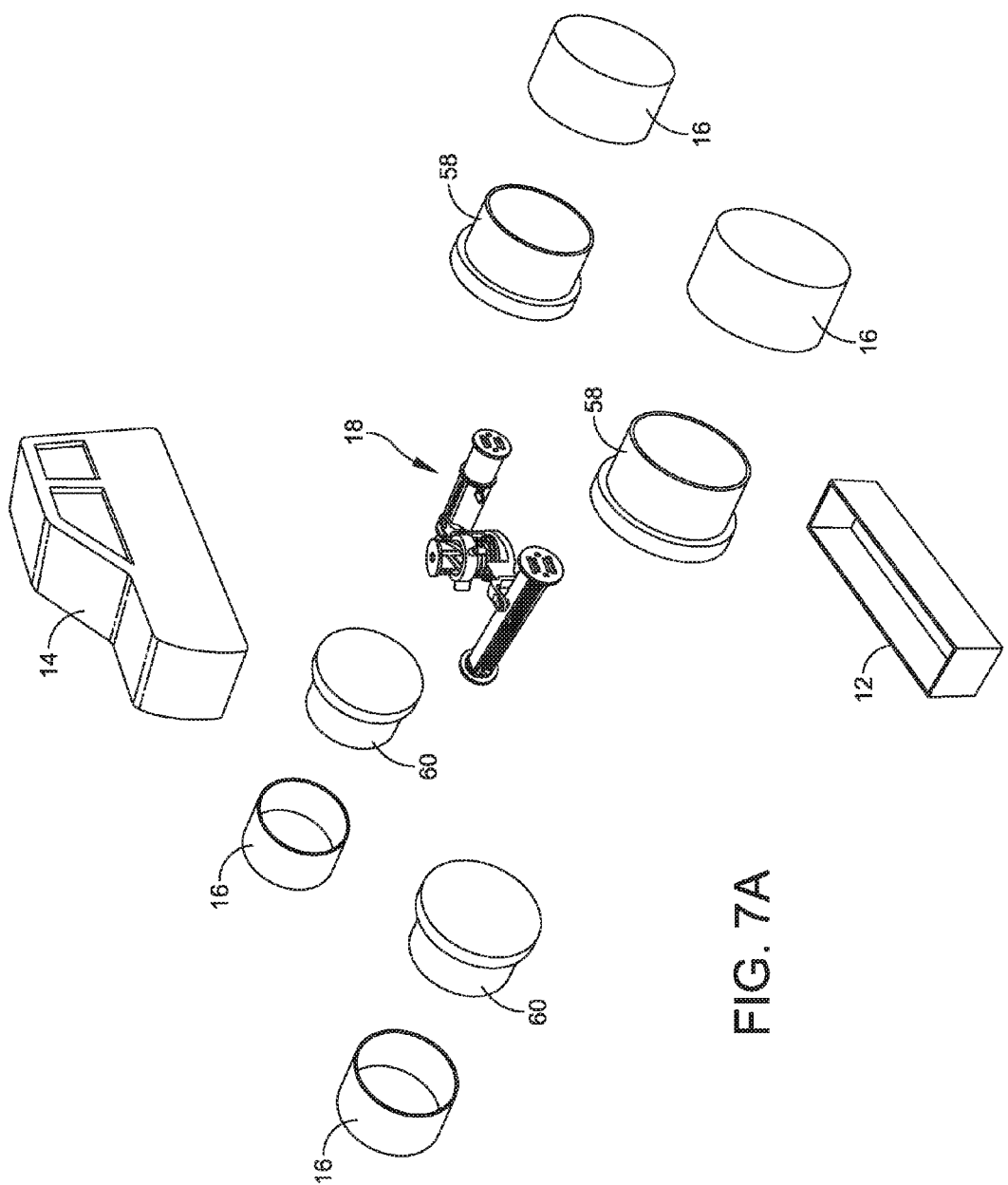
FIG. 7A is an exploded perspective view of the toy vehicle.
Figure 7B:
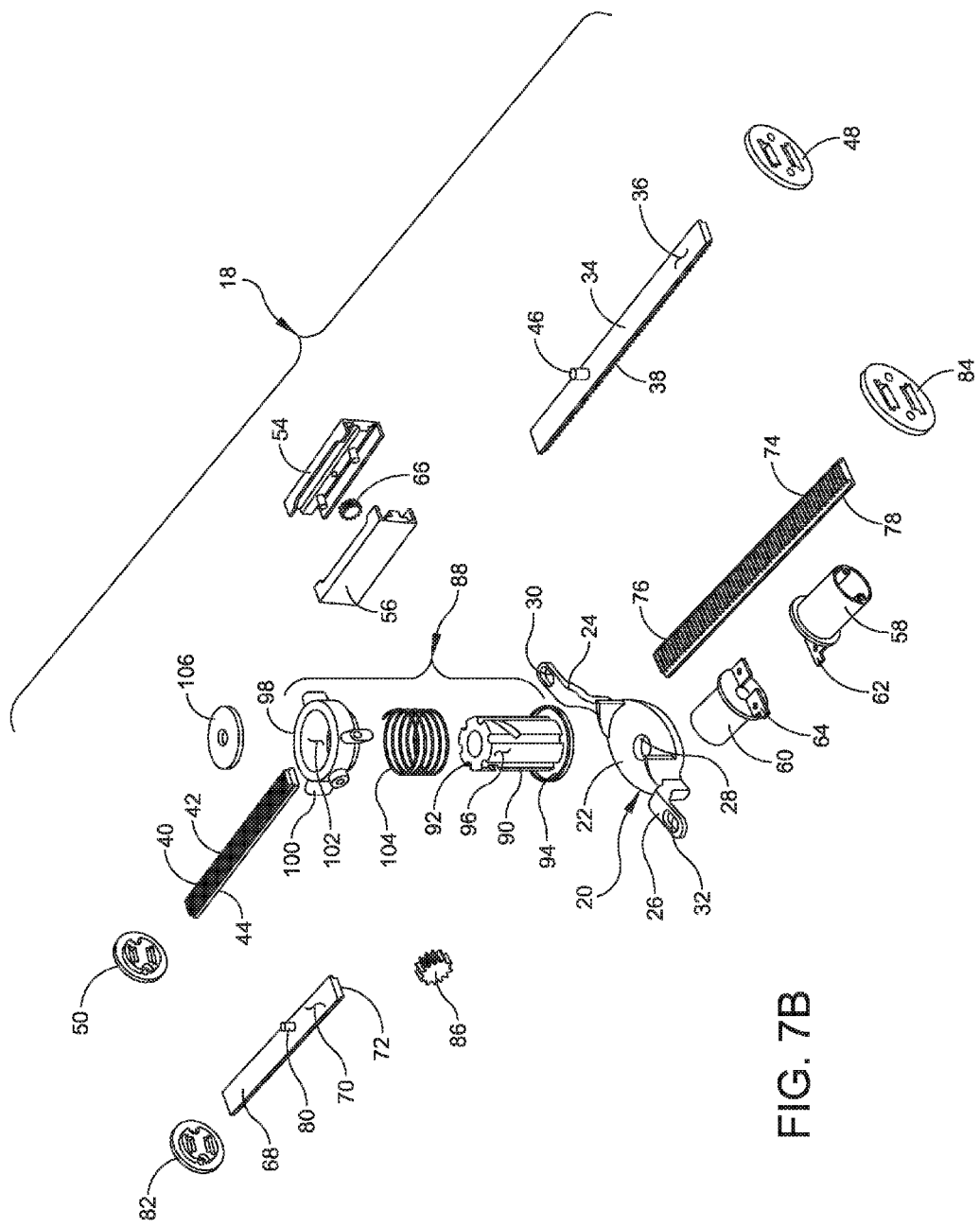
FIG. 7B is an exploded perspective view of the actuating mechanism.

Referring additionally to FIGS. 7A and 7B, the components of the actuating mechanism 18 are illustrated in an exploded condition. As shown, the actuating mechanism 18 includes a lever generally indicated at 20, which is pivotally connected to the chassis 12. The lever 20 has a body portion 22 and two arms 24, 26 that respectively extend from the body portion in opposite directions. The body portion 22 of the lever includes a centrally located opening 28 to pivotally connect the lever 18 to the chassis 12. In one embodiment, a bolt or some other type of fastener may be provided to secure the body portion 22 of the lever 20 to the chassis 12 with the bolt extending through the opening 28 to enable the rotatable movement of the lever with respect to the chassis. Each arm 24, 26 has an opening 30, 32 formed therein, respectively, the purpose of which is to connect the lever 20 to other components of the actuating mechanism 18. The lever 20 is configured to rotate or pivot between a first position (shown in FIGS. 3 and 4) and a second position (shown in FIGS. 5 and 6), which results in the wheels 16 in the retracted position and the extended position, respectively.

The actuating mechanism 18 further includes a first gear assembly associated with one of the front wheels 16 and the rear wheels 16 of the toy vehicle 10 and a second gear assembly associated with another of the front wheels 16 and the rear wheels 16 of the toy vehicle. As shown, the first gear assembly includes a first gear section 34 embodying a rack, which is a flat bar having a first, top surface 36 and a second, bottom surface 38, with teeth formed on the second surface. The first gear assembly further includes a second gear section 40 embodying a flat bar having a first, top surface 42 and a second bottom surface 44, with teeth formed on the first surface. The arrangement is that the teeth 38 of the first gear section 34 face the teeth 42 of the second gear section 40. The first gear section 34 of the first gear assembly includes a boss 46 provided on the first surface 36. The boss 46 is configured to be received within the opening 30 of the arm 24 of the lever 20 to pivotally connect the lever to the first gear section.

The first gear assembly further includes a first hub 48 secured to an outer end of the first gear section 34 and a second hub 50 secured to an outer end of the second gear section 40. The first gear assembly further includes a first housing 52 having a first housing section 54 and a second housing section 56. The first housing section 54 and the second housing section 56 are secured to one another to protect the first and second gear sections 34, 40 of the first gear assembly during operation of the actuating mechanism 18 and to connect the first gear assembly to the chassis 12. Two support cylinders 58, 60 are provided to extend from the first housing 52 at opposite ends of the first housing 52 to further protect the first and second gear sections 34, 40 of the first gear assembly. Each support cylinder 58, 60 includes a tab portion 62, 64, respectively, to secure the support cylinder to the first housing 52, e.g., by one or more screw fasteners.

The first gear assembly further includes a first pinion gear 66 disposed between the teeth 38 of the first gear section 34 and the teeth 42 of the second gear section 40. The arrangement is such that when the lever 20 is moved between the first position and the second position, the first gear section 34 and the second gear section 40 move laterally with respect to one another between the corresponding retracted position and extending position, respectively. The first gear assembly operates as a tradition rack-and-pinion gear in which torque is converted to linear force by meshing the first gear section 34 and the first pinion gear 66. Thus, when the first gear section 34 is moved laterally, the first pinion gear 66 rotates thereby moving the second gear section 40 in a straight line in an opposite direction.

Similarly, the second gear assembly includes a third gear section 68 embodying a flat bar having a first, top surface 70 and a second, bottom surface 72, with teeth formed on the second surface. The second gear assembly further includes a fourth gear section 74 embodying a flat bar having a first, top surface 76 and a second bottom surface 78, with teeth formed on the first surface. The arrangement is that the teeth 72 of the third gear section 68 face the teeth 76 of the fourth gear section 74. The third gear section 68 of the second gear assembly includes a boss 80 provided on the first surface 70. The boss 80 is configured to be received within the opening 32 of the other arm 26 of the lever 20 to pivotally connect the lever to the third gear section 68.

As with the first gear assembly, the second gear assembly further includes a third hub 82 secured to an outer end of the third gear section 68 and a fourth hub 84 secured to an opposite outer end of the fourth gear section 74. Although not shown in the drawings, the third gear assembly further may include a second housing having a third housing section and a fourth housing section that are secured to one another to protect the third and fourth gear sections 68, 74 during operation of the actuating mechanism 18 in a manner similar to the first housing section 54 and the second housing section 56 of the first housing 52. Additionally, two support cylinders may be provided to extend from the second housing at ends of the second housing to further protect the third and fourth gear sections 68, 74 of the second gear assembly in a manner similar to the two support cylinders 58, 60 of the first housing 52. Each support cylinder may include a tab portion to secure the support cylinder to the second housing.

The second gear assembly further includes a second pinion gear 86 disposed between the teeth 72 of the third gear section 68 and the teeth 76 of the fourth gear section 74. The arrangement is such that when the lever 20 is moved between the first position and the second position, the third gear section 68 and the fourth gear section 74 move laterally with respect to one another between its corresponding retracted configuration and extending configuration, respectively. Thus, when the third gear section 68 is moved laterally, the second pinion gear 86 turns thereby moving the fourth gear section 74 in a straight line in an opposite direction.

The actuating mechanism 18 further includes an actuator generally indicated at 88 that is configured to move the lever 20 between the first position and the second position, which in turn moves the first gear assembly and the second gear assembly between their respective retracted positions and extended positions. As shown, the actuator 88 includes a spindle 90, which is secured to the lever 20 by a suitable fastener. The spindle 90 has a cylindrical body 92 having a lower flange 94 that is secured to the lever 20 and a cam surface 96 provided on an outer surface of the cylindrical body. The actuator 88 further includes a collar 98 positioned over the spindle 90. The collar 98 includes an annular body 100 having an inner surface 102 configured to engage the cam surface 96 of the spindle 90 to rotate the spindle as the collar travels from an upper end of the cylindrical body 92 of the spindle to a lower end of the cylindrical body of the spindle. The actuator 88 further includes a spring 104 disposed between the flange 94 of the spindle 90 and the collar 98 to bias the collar to an upwards position with respect to the cylindrical body 92 of the spindle. An end cap 106 is secured to the upper end of the cylindrical body 92 of the spindle 90 to secure the collar 98 and the spring 104 in place about the cylindrical body of the spindle. In one embodiment, the collar 98 includes a pin that rides along in a groove formed in the cam surface 96 to create the rotational movement of the spindle 90 and the lever 20, which in turn creates the lateral movement of the first gear section 34 and the second gear section 40.

Referring back to FIGS. 1A, 1B, 2A and 2B, the packaging 14 of the toy vehicle 10 that defines a cockpit 108 of the toy vehicle is configured to engage the collar 98 of the actuator 88 of the actuating mechanism 18. In order to extend the wheels 16 from the retracted configuration to the extended configuration, an operator of the toy vehicle 10, e.g., a child, presses the cockpit 108 to move the collar 98 downwardly with respect to the spindle 90 thereby pivoting the lever 20 from the first position in which the wheels are all retracted to form a relatively narrow wheel width to the second position in which the wheels are all extended to form a relatively wide wheel width. Similarly, in order to retract the wheels 16 from the extended configuration to the retracted configuration, the operator presses the cockpit 108 to move the collar 98 downwardly with respect to the spindle 90 thereby pivoting the lever 20 from the second position in which the wheels are all extended to the first position in which the wheels are all retraced to form a relatively narrow wheel width.

Figure 8:
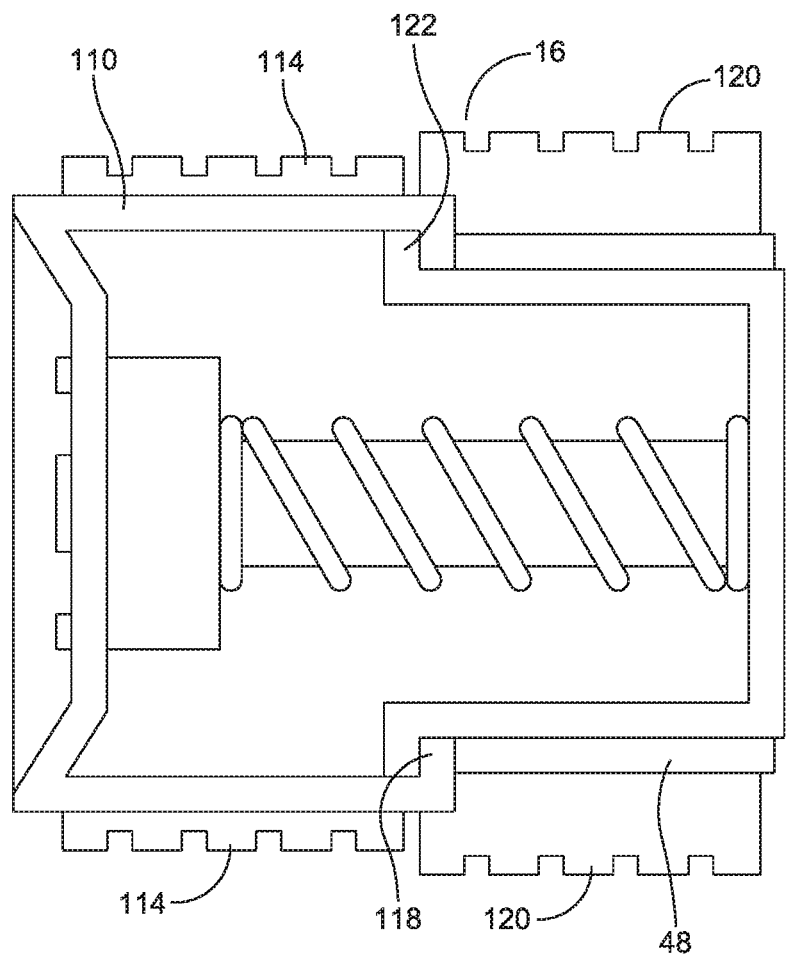
FIG. 8 is a cross-sectional view of a wheel of the toy vehicle.

Referring to FIG. 8, each wheel 16 includes an outer wheel section 110 that is coupled to the hub (e.g., one of hubs 48, 50, 82, 84) by a suitable screw fastener. Each wheel 16 is slidable with respect to its respective hub 48, 50 to extend the width of the wheel base. In one embodiment, the outer wheel section 110 includes treads, each indicated at 114, formed on an outer surface of the outer wheel section. The outer wheel section 110 further includes an inwardly projecting rim 118. The hub, e.g., hub 48, includes treads, each indicated at 120. The hub, e.g., hub 48, further includes an outwardly projecting rim 122, which when the hub, e.g., hub 48, section is disposed within the outer wheel section 110, engages the rim 118 of the outer wheel section to prevent the outer wheel section from being completely removed from the hub.

Thus, when actuating the actuating mechanism 18 by pressing the actuator 88 via the packaging 14, e.g., the cockpit 108, the movement of the lever 20 and the first gear assembly and the second gear assembly causes the lateral movement of the outer wheel section 110 with respect to the hub, e.g., hub 48, to extend and retract each wheel, depending on the existing condition of the wheels. For example, when the wheels 16 are in their retracted condition, pressing the actuator 88 causes the wheels to extend so that the wheels are wider. When the wheels 16 are in their extended condition, pressing the actuator 88 causes the wheels to retract so that the wheels are narrower.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A toy vehicle comprising:
   a chassis;
   at least two wheels; and
   an actuating mechanism configured to couple the at least two wheels to the chassis and to move the at least two wheels between a retracted position and an extended position in which a width of each wheel of the at least two wheels is increased, the actuating mechanism including a lever configured to be moved between a first position corresponding to the retracted position of the at least two wheels and a second position corresponding to the extended position of the at least two wheels, the actuating mechanism further including a first gear section secured to a first arm of the lever and coupled to a first hub of a first wheel of the at least two wheels, and a second gear section coupled to a second hub of a second wheel of the at least two wheels,
   wherein the first gear section is coupled to the second gear section by a gear.

2. A toy vehicle comprising:
   a chassis;
   at least two wheels; and
   an actuating mechanism configured to couple the at least two wheels to the chassis and to move the at least two wheels between a retracted position and an extended position in which a width of each wheel of the at least two wheels is increased, the actuating mechanism including a lever configured to be moved between a first position corresponding to the retracted position of the at least two wheels and a second position corresponding to the extended position of the at least two wheels, the actuating mechanism further including a first gear section secured to a first arm of the lever and coupled to a first hub of a first wheel of the at least two wheels, and a second gear section coupled to a second hub of a second wheel of the at least two wheels,
   wherein the actuating mechanism further includes an actuator configured to move the lever from the first position to the second position and from the second position to the first position.

3. The toy vehicle of claim 2, wherein the actuator includes a spindle having a cam surface, a collar having an inner surface configured to engage the cam surface of the spindle, and a spring configured to bias the collar, the spindle being secured to the lever to move the lever from one of the first position to the second position and the second position to the first position when moving the collar from a raised position to a lowered position.

4. The toy vehicle of claim 3, further comprising packaging coupled to the collar to move the collar from the raised position to the lowered position, with the spring being configured to move the collar back to the raised position.

5. The toy vehicle of claim 2, wherein the actuating mechanism further includes a third gear section secured to a second arm of the lever and coupled to a third hub of a third wheel of the at least two wheels, and a fourth gear section coupled to a fourth hub of a fourth wheel of the at least two wheels.

6. The toy vehicle of claim 5, wherein each wheel of the at least two wheels includes an outer wheel section movable with respect to its respective hub.

7. The toy vehicle of claim 6, wherein the outer wheel section has treads.

8. The toy vehicle of claim 7, wherein the toy vehicle is one of a truck and a passenger vehicle.

9. A toy vehicle comprising:
   a chassis;
   two front wheels coupled to the chassis and two rear wheels coupled to the chassis; and
   an actuating mechanism configured to couple the front wheels and the rear wheels to the chassis and to move each wheel of the front wheels and the rear wheels between a retracted position and an extended position in which a width of the wheel is increased, the actuating mechanism including a lever configured to be moved between a first position corresponding to the retracted position of each wheel of the front wheels and the rear wheels and a second position corresponding to the extended position of each wheel of the front wheels and the rear wheels, the actuating mechanism further including a first gear section secured to a first arm of the lever and coupled to a first hub of a first wheel of the at least two wheels and a second gear section coupled to a second hub of a second wheel of the at least two wheels,
   wherein the actuating mechanism further includes a third gear section secured to a second arm of the lever and coupled to a third hub of a third wheel of the at least two wheels, and a fourth gear section coupled to a fourth hub of a fourth wheel of the at least two wheels.

10. The toy vehicle of claim 9, wherein the first gear section is coupled to the second gear section by a first gear and the third gear section is coupled to the fourth gear section by a second gear.

11. The toy vehicle of claim 9, wherein the actuating mechanism further includes an actuator configured to move the lever from the first position to the second position and from the second position to the first position.

12. The toy vehicle of claim 11, wherein the actuator includes a spindle having a cam surface, a collar having an inner surface configured to engage the cam surface of the spindle, and a spring configured to bias the collar, the spindle being secured to the lever to move the lever from one of the first position to the second position and the second position to the first position when moving the collar from a raised position to a lowered position.

13. The toy vehicle of claim 12, further comprising packaging coupled to the collar to move the collar from the raised position to the lowered position, with the spring being configured to move the collar back to the raised position.

14. The toy vehicle of claim 13, wherein each wheel of the at least two wheels includes an outer wheel section movable with respect to its respective hub.

\* \* \* \* \*